United States Patent

Himes et al.

[11] Patent Number: 5,393,841

[45] Date of Patent: Feb. 28, 1995

[54] DISSIMILAR ARM ASYMMETRIC RADIAL OR STAR BLOCK COPOLYMERS FOR ADHESIVES AND SEALANTS

[75] Inventors: Glenn R. Himes; Bridget A. Spence; Ronald J. Hoxmeier; Steven S. Chin, all of Houston, Tex.

[73] Assignee: Shell Oil Company, Houston, Tex.

[21] Appl. No.: 149,595

[22] Filed: Nov. 9, 1993

[51] Int. Cl.$^6$ .......................................... C08F 297/04
[52] U.S. Cl. ........................................ 525/314; 525/98
[58] Field of Search ................... 525/314, 338, 98, 95

[56] References Cited

U.S. PATENT DOCUMENTS

| | | | |
|---|---|---|---|
| 4,163,764 | 8/1979 | Nash | 525/314 |
| 4,346,193 | 8/1982 | Warfel | 525/314 |
| 4,391,949 | 7/1983 | St. Clair . | |
| 4,849,481 | 7/1989 | Rhodes et al. | 525/314 |
| 5,001,199 | 3/1991 | Hoxmeier | 525/338 |
| 5,149,895 | 9/1992 | Coolbaugh et al. | 525/314 |

Primary Examiner—James J. Seidleck
Assistant Examiner—M. L. Warzel
Attorney, Agent, or Firm—Donald F. Haas

[57] ABSTRACT

Radial or star asymmetric block copolymer of the following formulae and improved adhesive and sealant compositions containing them (I) $(A-HD)_x-Y-(UD)_z$ or (II)
$(UD-A-HD)_x-Y$ or (III)
$((UD)_y-A-HD)_x-Y-(UD)_z$ wherein A is a vinyl aromatic hydrocarbon block having a molecular weight of from 4000 to 20,000, HD is a hydrogenated conjugated diene block having a molecular weight of from 10,000 to 100,000, Y is a multifunctional coupling agent, UD is an unhydrogenated conjugated diene block having a molecular weight of from 1000 to 80,000, x is an integer from 2 to 20, y is 0 or 1, z is an integer from 1 to 10, and x+z ranges from 3 to 30.

9 Claims, No Drawings

1

DISSIMILAR ARM ASYMMETRIC RADIAL OR STAR BLOCK COPOLYMERS FOR ADHESIVES AND SEALANTS

BACKGROUND OF THE INVENTION

This invention is directed to adhesive and sealant compositions which contain dissimilar arm asymmetric radial block copolymers. More particularly, the invention is related to such compositions containing asymmetric block copolymers which have both hydrogenated and unhydrogenated sets of arms.

Block copolymers have been employed in adhesive compositions for many years, primarily because of their high cohesive strengths and their ability to crosslink without a chemical vulcanization step. Block copolymers such as those described in U.S. Pat. No. 3,239,478 are either linear or radial or star styrene-butadiene or styrene-isoprene block copolymers. The high cohesive strength of these polymers is often a detrimental quality in certain applications. In the past, cohesive strength was reduced by adding a styrene-isoprene diblock copolymer to the primary block copolymer to lower the cohesive strength and give less elasticity and better conformability. U.S. Pat. No. 4,391,949 suggested another approach whereby a star-shaped asymmetric block copolymer having styrene-diene and diene homopolymer arms was used.

These conventional block copolymers when used in adhesives tend to degrade in processing and/or over time because they are unsaturated in the main rubber chain. These unsaturation sites are reactive sites which are vulnerable to attack, such as by free radicals created by oxidation, ultraviolet light or mechanical action. As a result, the polymer chain may be severed by chain scission, reducing the molecular weight and those properties which are sensitive to molecular weight. Alternatively, the unsaturation sites may be subjected to grafting and crosslinking reactions which raise the molecular weight and undesirably stiffen the polymer making it unprocessable or ineffective as an adhesive. Hydrogenating the conventional unsaturated base polymers creates a nonpolar polymer which, although more stable, is difficult to tackify with resin additives and which is therefore inferior to conventional polymers in some applications, including pressure sensitive adhesives.

The present invention offers a solution to some of these problems without sacrificing the adhesive qualities of unsaturated block copolymers. It does so by providing a polymer which has both unsaturated and saturated arms.

SUMMARY OF THE INVENTION

The present invention provides improved adhesive and sealant compositions which comprise a radial or star asymmetric block copolymer of the formulae

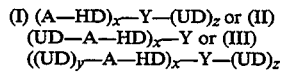

wherein A is a vinyl aromatic hydrocarbon block having a molecular weight of from 4000 to 20,000, HD is a hydrogenated conjugated diene block having a molecular weight of from 10,000 to 100,000, Y is a multifunctional coupling agent, UD is an unhydrogenated conjugated diene block having a molecular weight of from 1000 to 80,000, x is an integer from 2 to 20, preferably 2 to 4, y is 0 or 1, z is an integer from 1 to 10, preferably 1 to 4, and $x+z$ ranges from 3 to 30, preferably 3 to 6; and from 20 to 400 parts per 100 parts of copolymer of a tackifying resin. These compositions may also contain resins which extend the diene phase, resins which reinforce and/or extend the vinyl aromatic phase, polyolefins, fillers, wax, stabilizers and reactive components designed to crosslink the polymers and/or resins.

DETAILED DESCRIPTION OF THE INVENTION

The primary novel component of the adhesive and sealant compositions of the present invention is the above-described block copolymer which has both saturated and unsaturated arms. The styrene-hydrogenated diene arms provide the primary load bearing capability of the adhesive and sealant compositions. It is important that these arms be hydrogenated so that the structural integrity of the polymer is preserved even if outside forces cause degradation of the unsaturated side chains. The unsaturated diene homopolymer arms are important in the composition to give the composition sufficient tack properties and/or the ability to be tackified to make effective compositions, such as pressure sensitive adhesive compositions.

The A blocks are polymer blocks of a vinyl aromatic hydrocarbon. Preferably, the vinyl aromatic hydrocarbon is styrene. Other useful vinyl aromatic hydrocarbons include alphamethyl styrene, various alkyl-substituted styrenes, alkoxy-substituted styrenes, vinyl naphthalene, vinyl toluene and the like. The HD and UD blocks are polymer blocks of conjugated dienes. The preferred diene for the HD blocks is butadiene. Isoprene is preferred for the UD blocks. Other dienes may also be used, including piperylene, methylpentadiene, phenylbutadiene, 3,4-dimethyl-1,3-hexadiene, 4,5-diethyl-1,3-octadiene and the like, preferably those conjugated dienes containing 4 to 8 carbon atoms. It is preferred that the conjugated diene employed in the HD block differ from that employed in the UD block, especially in respect to ease of hydrogenation.

The diene in the HD block should preferably hydrogenate faster and more completely than the diene in the UD block. The amount of hydrogenation in the unsaturated (UD) blocks after the reaction should be such that at least 50 percent, preferably at least 75 percent, most preferably at least 90 percent, of the original unsaturated diene remain unreacted.

The A—HD arms or blocks may be hydrogenated as generally described in the prior art, preferably so as to reduce at least about 90 percent of any olefinic double bonds in the polymer chains. Suitably at least 50 percent, preferably at least 70 percent, and more preferably at least 90 percent, most preferably at least 95 percent of the original olefinic unsaturation is hydrogenated.

The dienes used in this invention preferably should be those which are largely amorphous at use temperatures (usually 10° C. to 40° C.) and do not contain excess crystallinity which would interfere with flexibility. For butadiene, e.g., the percent of 1,2 addition should preferably be 30 percent to 65 percent to prevent excessive crystallinity after hydrogenation to ethylene-butylene (EB) rubber. Below 30 percent crystallinity is too high, giving a stiff polymer which is unsuitable for pressure sensitive adhesives. Above 65 percent the Tg (glass transition temperature) of the polymer is too high, making it difficult to formulate an acceptable pressure sensitive adhesive.

The preferred method for making the block copolymers of the present invention is basically described in European Patent Application 0,314,256. Therein is disclosed a two-step process for producing asymmetric radial polymers which avoids the problem of the production of the unwanted homopolydiene polymer. The process involves separately polymerizing the monomers to create separately the two different types of arms. Then one of the polymeric arms is coupled to the coupling agent and when that coupling reaction is complete, the second set of polymer arms is coupled to the coupling agent. This ensures that there will be very little homopolydiene in the final polymer. In the present invention, for example, isoprene arms would be anionically polymerized, and coupled via the coupling agent. Subsequently or in parallel, styrene-butadiene (SB) arms would be anionically polymerized and at least 2 arms then coupled to the isoprene arms via the coupling agent. These unhydrogenated precursors are useful as adhesives and sealants on their own but they suffer the stability problems common to polymers with a high degree of unsaturation (for example, $(SB)_2-Y-I_2$). Subsequently, the coupled polymer is hydrogenated under conditions that preferably hydrogenate the diene of the A—HD arm (or block) only, leaving the diene of the UD arm (or block) essentially unsaturated.

In general, the method described is used to prepare asymmetric radial or star polymers with any polymer containing a reactive end group which will react with one or more functional groups contained in the selected coupling agent. The method is particularly suitable for the preparation of asymmetric radial polymers from so-called "living" polymers containing a single terminal metal ion. As is well known in the prior art, "living" polymers are polymers containing at least one active group such as a metal atom bonded directly to a carbon atom. "Living" polymers are readily prepared via anionic polymerization. Since the present invention is particularly well suited to the preparation of asymmetric radial polymers using "living" polymers to form the arms thereof, the invention will be described by reference to such polymers. It will, however, be appreciated that the invention would be equally useful with polymers having different reactive groups so long as the selected coupling agent contains functional groups which are reactive with the reactive site contained in the polymer.

Living polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202. Methods for preparing block copolymers such as those preferred for use in the method of the present invention are also taught, for example, in U.S. Pat. Nos. 3,231,635; 3,265,765 and 3,322,856. These patents are herein incorporated by reference. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers useful as arms in the asymmetric radial polymers of this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

$$RLi$$

wherein R is an aliphatic, cycloaliphatic, alkyl-substituted cycloaliphatic, aromatic or alkyl-substituted aromatic hydrocarbon radical having from 1 to 20 carbon atoms.

In general, the living polymers used as arms in the asymmetric radial polymer will be contacted with the coupling agent at a temperature within the range from 0° C. to 100° C. at a pressure within the range from 0 bar to 7 bar and the contacting will be maintained until reaction between the arms and the coupling agent is complete or at least substantially completed, generally for a period of time within the range from 1 to 180 minutes.

In general, the polymers useful as arms in the asymmetric radial polymers of this invention will be in solution when contacted with the coupling agent. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like. Since the polymers useful in making the asymmetric radial polymers of this invention will contain a single terminal reactive group, the polymers used in preparation of the asymmetric radial polymers will be retained in solution after preparation without deactivating the reactive (living) site. In general, the coupling agents may be added to a solution of the polymer or a solution of the polymer may be added to the coupling agent.

Any of the coupling agents known in the prior art to be useful in forming a radial polymer by contacting the same with a living polymer may be used in both the method of this invention and the asymmetric radial polymers of this invention. Suitable coupling agents will contain three or more functional groups which will react with the living polymer at the metal-carbon bond. While the method of the present invention will improve the relative distribution of different arms in an asymmetric radial polymer having any number of arms, the method is very effective when the coupling agent contains from three to about twenty functional groups reactive with the metal-carbon bond of the "living" polymer. Suitable coupling agents, then include $SIX_4$, $RSiX_3$, $HSiX_3$, $X_3Si-SiX_3$, $RX_2Si-(CH_2)_x-SiX_2R$, $RX_2Si(CH_2)_x-SiX_2-(CH_2)_x-SiX_2R$, $X_3Si-(CH_2)_x-SiX_3$, $R-C(SiX_3)_3$, $R-C(CH_2SiX_3)_3$, $C(CH_2SiX_3)_4$ and the like, particularly those containing from three to about six functional groups. In the foregoing formulae: each X may, independently, be fluorine, chlorine, bromine, iodine, alkoxide radicals, carboxylate radicals, hydride and the like; R is a hydrocarbyl radical having from 1 to about 10 carbon atoms, preferably from 1 to about 6 carbon atoms; and x is a whole number from 1 to about 6. Particularly useful coupling agents include the silicon tetrahalides such as silicon tetrafluoride, silicon tetrachloride, silicon tetrabromide and the like, and bis(trihalo)silanes such as bis(trihalo)silylethane and hexahalodisilane where the halogen may be fluorine, chlorine, bromine, or iodine.

The coupling process per se is described in detail in U.S. Pat. No. 4,096,203 which is herein incorporated by reference. Specific multifunctional coupling agents useful herein are described in that patent but there are other coupling agents which may also be useful herein.

Star polymers are made by coupling polymer arms using a polyfunctional coupling agent or coupling monomer. A preferred coupling agent is a polyalkenyl aromatic coupling agent such as those described in U.S. Pat. Nos. 4,010,226, 4,391,949 and 4,444,953, which are herein incorporated by reference. U.S. Pat. No. 5,104,921, which is also herein incorporated by reference, contains a complete description of such polyalkenyl aromatic compounds at columns 12 and 13. Divinyl aromatic hydrocarbons containing up to 26 carbon atoms per molecule are preferred and particularly divinyl benzene in either its meta, or para isomer and commercial divinyl benzene which is a mixture of said isomers is also quite satisfactory. The coupling agent is preferably added to the living polymer after the polymerization is substantially complete. The amount of coupling agent varies between wide limits but preferably at least one equivalent is used per equivalent of unsaturated living polymer to be coupled. The coupling reaction is generally carried out in the same solvent as for the polymerization reaction. The temperature varies between wide limits, for example, from 25° C. to 95° C.

The hydrogenation of these copolymer arms may be carded out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the present of a soluble hydrogenation catalysts. Such processes are disclosed in U.S. Pat. Nos. 3,113,986, 4,226,952 and Re. 27,145, the disclosures of which are herein incorporated by reference. The polymers are hydrogenated in such a manner as to produce hydrogenated polymers having a residual unsaturation content in the polydiene block of less than about 20 percent, and preferably as close to 0 percent as possible, of their original unsaturation content prior to hydrogenation. A titanium catalyst such as disclosed in U.S. Pat. No. 5,039,755, which is herein incorporated by reference, may also be used in the hydrogenation process.

In a preferred aspect of the invention, the asymmetric/dissimilar arm structure affords the possibility of augmenting the tack of saturated polymers by incorporation of freely rotating rubber chain ends in the molecule, which are more readily tackified by resin additives than chains which are terminated by hard (polystyrene) blocks. An example would be a 6 arm polymer, 4 arms of which are polyisoprene and 2 of which are poly(styrene-ethylene/butylene). The poly(styrene-ethylene/butylene) is hydrogenated poly(styrene-butadiene). This polymer is an example of a preferred radial polymer within the scope of formula (I) described above wherein A is styrene, HD is ethylene/butylene (EB), x is 2, z is 4, Y is a hexafunctional coupling agent, and UD is polyisoprene. The freely rotating homopolymer chain ends are readily tackified, while the copolymer arms provide load-bearing.

An especially preferred embodiment of the invention is $(I-S-EB)_x-Y$, where I is a polyisoprene block, S is a polystyrene block, EB is a poly(ethylene/butylene) rubber block, and x and Y have the meanings described previously. In this embodiment, hydrogenation of the polybutadiene block to form the poly(ethylene/butylene) block is carried out under conditions that are selective for polybutadiene reaction and essentially exclude hydrogenation of the polyisoprene block. The unsaturated polyisoprene block is especially effective for imparting tack and peel strength to adhesive compositions.

The present invention also contemplates asymmetric/dissimilar arm structure radial and star polymers of the type described herein which are entirely saturated. These polymers afford the possibility of augmenting the tack of saturated polymers by incorporation of freely rotating rubber chain ends, albeit saturated chain ends, in the molecule which are more readily tackified by resin additives than chains which are terminated by hard (polystyrene) blocks. An example would be a 4 arm polymer, 2 arms of which are hydrogenated polyisoprene and 2 arms of which are hydrogenated poly(styrene-butadiene). The freely rotating saturated homopolymer chain ends are more readily tackified while the saturated copolymer arms provide load-bearing.

The polymers of the present invention generally will have an A block content (polystyrene content if A is styrene) of from 4 to 35 percent, preferably from 12 to 25 percent. This range provides the formulation latitude to achieve acceptable tack and shear properties demanded by the particular application. The polymers of the present invention preferably have a molecular weight of from 35,000 to 300,000. The A blocks have a molecular weight of from 4000 to 20,000. A blocks less than 4000 do not form domains of pure A and thus are not load-bearing. A blocks greater than 20,000 impart excess stiffness, thereby preventing pressure sensitivity in adhesives. The HD blocks should have a molecular weight of from 10,000 to 100,000. HD blocks less than 10,000 provide a weak polymer with poor cohesive strength and low shear properties. HD blocks greater than 100,000 make the rubber and adhesive compositions difficult to process. The UD blocks should have a molecular weight of from 1000 to 80,000. UD blocks less than 1000 do not express tack and peel strength improvement in adhesives because they are not long enough to interact with substrate surfaces. UD blocks greater than 80,000 soften the adhesive composition excessively, reducing cohesive strength and holding power.

Molecular weights are conveniently measured by Gel Permeation Chromatography (GPC), where the GPC system has been appropriately calibrated. Polymers of known molecular weight are used to calibrate and these must be of the same molecular structure and chemical composition as the unknown block polymers that are measured. Anionically polymerized linear block polymers are close to monodisperse and it is both convenient and adequately descriptive to report the "peak" molecular weight of the narrow molecular weight distribution observed. The "peak" molecular weight is very nearly the same as the weight average molecular weight of the block polymer. For block polymers that are more polydisperse, a weight average molecular weight should be measured by light scattering or calculated from GPC data. Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modem Size-Exclusion Liquid Chromatography*, W. W. Yau, J. J. Kirkland, D. D. Bly, John Wiley & Sons, New York, N.Y., 1979.
2. *Light Scattering from Polymer Solution*, M. B. Huglin, ed., Academic Press, New York, N.Y., 1972.
3. W. Kaye and A. J. Havlik, *Applied Optics*, 12, 541 (1973).
4. M. L. McConnell, *American Laboratory*, 63, May, 1978.

The saturated and/or unsaturated arms of the copolymers of the present invention may be functionalized, such as with polar groups which increase adhesion to many types of surfaces, especially high energy surfaces. For example, the unsaturated arms may be epoxidized or carboxylated. Saturated arms may, for example, be maleated or silanated. Depending upon the type of functional group added, crosslinking may be accomplished through these groups. Specific groups for this purpose include acids, such as carboxylic acids, anhydrides, such as carboxylic acid anhydrides, epoxidizing agents, acrylates, vinylalkoxysilanes and the like.

The polymers, functionalized or unfunctionalized, of this invention may be cured by ultraviolet or electron beam radiation, but radiation curing utilizing a wide variety of electromagnetic wavelength is feasible. Either ionizing radiation such as alpha, beta, gamma, X-rays and high energy electrons or non-ionizing radiation such as ultraviolet, visible, infrared, microwave and radio frequency may be used.

The most common source of alpha, beta and gamma radiation are radioactive nuclei. An ionizing radiation source with commercial polymer crosslinking application is gamma radiation that is produced from either cobalt-60 or cesium-137 radioactive nuclei. X-rays can be produced through deacceleration of high speed electrons through the electric field of an atomic nucleus.

High voltage electron accelerators are preferred over gamma radiation and certain types of X-ray processing equipment. High energy electrons produced by machine acceleration, as opposed to radioisotopes, can be applied easily to industrial processes for the following reasons: easy on-off switching capability; less shielding is required than with gamma radiation; accelerator beams are directional and less penetrating than gamma or X-rays; and electron radiation provides high dose rates, i.e. maximum penetration per unit density of material, and is well suited for on-line, high speed processing applications. Commercially available high or low energy electron-processing equipment are the Dynamitron® device, dynacote, insulating-core transformer, linear accelerator, Van de Graaff accelerator, pelletron, laddertron and linear cathode. Manufacturers of high voltage electron-accelerator equipment are High Voltage Engineering Corporation, Burlington, Mass. and Radiation Dynamics, Inc., Westbury, N.Y. Manufacturers of low energy electron beam generating equipment include American International Technologies, Inc., of Torrance, Calif.; RPC Industries of Hayward, Calif.; and Energy Sciences of Wilmington, Mass.

Ultraviolet light sources may be based on the mercury-vapor arc. Mercury is enclosed in a quartz tube and a potential is applied to electrodes at either end of the tube. The electrodes can be of mercury, iron, tungsten or other metals. The pressure in the mercury-vapor lamp may be less than 1 atm to more than 10 atm. As the mercury pressure and lamp operating temperatures are increased, the radiation becomes more intense and the width of the emission lines increases. Other UV light sources include electrodeless lamps, Xenon lamps, pulsed Xenon lamps, Argon ion lasers and Excimer lasers.

Visible light sources can be obtained from high pressure mercury arcs by addition of rare gases or metal halides, which increase the number of emission lines in the 350–600 nm region of the spectrum. Fluorescent lamps, tungsten halide lamps and visible lasers may also be utilized.

The presence of water in the polymer composition during the radiation crosslinking is very undesirable due to the tendency of water to terminate the crosslinking. The radiation curing is therefore generally more effective if the polymeric composition is at a temperature near or above the boiling point of water at the time of the radiation curing.

The amount of radiation necessary for high gel formation varies with the thickness of the polymeric mass being irradiated, the amount of unsaturation or, functionality, the extent to which the unsaturation or functionality is concentrated in specific regions within the polymeric mass and the type of radiation utilized. When electron beam radiation is utilized, radiation doses of about 0.1 Mrads to about 16 Mrads are acceptable and from about 0.1 Mrads to about 5 Mrads are preferred because of equipment cost and possible damage to substrate material.

When using non-ionizing radiation it is necessary to employ a photoinitiator to initiate the crosslinking reaction. Useful photoinitiators include diaryliodonium, alkoxy-substituted diaryliodonium, triarylsulfonium, dialkylphenacylsulfonium, and dialkyl-4-hydroxyphenylsulfonium salts. The anions in these salts generally possess low nucleophilic character and include $SbF_6-$, $BF_4-$, $PF_6-$ and $AsF_6-$. Specific examples include (4-octyloxyphenyl)-phenyl-iodonium hexafluoroantimonate, UVI-6990 (from Union Carbide), and FX-512 (3M Company). Bis(dodecylphenyl)iodonium hexafluoroantimonate, UV 9310C (GE), and, UVI-6974 (Union Carbide), are especially effective. The onium salts can be used alone or in conjunction with a photosensitizer to respond to long wave length UV and visible light. Examples of photosensitizers include thioxanthone, anthracene, perylene, phenothiazione, 1,2-benzathracene coronene, pyrene and tetracene. The photoinitiator and photosensitizer are chosen to be compatible with the polymer being crosslinked and the light source available.

Radiation induced cationic curing may also be done in combination with free radical curing. Free radical curing can be further enhanced by the addition of additional free radical photoinitiators and photosensitizers for them.

Reactive (radiation curable) diluents that can be added to the polymer include alcohols, vinyl ethers, epoxides, acrylate and methacrylate monomers, oligomers and polymers. They may also be blended with other diene-based polymers. Examples include bis(2,3-epoxy cyclopentyl)ether vinyl cyclohexene dioxide, limonene dioxide, epoxidized soya and linseed oils and fatty acids, vernonia oil, and UVI 6110 (Union Carbide).

The polymers may also be cured without the use of radiation by addition of a cationic initiator. Suitable initiators include the halides of tin, aluminum, zinc, boron, silicon, iron, titanium, magnesium and antimony, and the fluoroborates of many of these metals. $BF_3$ complexes such as $BF_3$-ether and $BF_3$-amine are included. Also useful are strong Bronsted acids such as trifluoromethanesulfonic acid (triflic acid) and the salts of triflic acid such as FC-520 (3M Company). The cationic initiator is chosen to be compatible with the polymer being crosslinked, the method of application and cure temperature. The polymers may also be crosslinked by the addition of multifunctional carboxylic acids and acid anhydrides and in general by the curing methods described in U.S. Pat. No. 3,970,608, which is incorporated by reference. Radiation crosslinking is preferred for adhesives because reactive ingredients do not come in contact with warm adhesives.

The materials of the present invention including in many cases crosslinked versions are useful in adhesives (including pressure sensitive adhesives, contact adhesives, laminating adhesives and assembly adhesives, labels, packaging adhesives, weatherable tapes), sealants, printing plates, oil gels, and maskants. Crosslinked forms of the invention are especially useful in applications requiring resistance to elevated temperatures. However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might contain only the polymers of the present invention and, e.g., a curing agent. However, in most adhesive and sealant applications, suitable formulations would also contain various combinations of resins, plasticizers, fillers, stabilizers and other ingredients such as asphalt. The following are some typical examples of formulations for sealants.

In adhesives and sealant applications, it is common practice to add an adhesion promoting or tackifying resin that is compatible with the polymer, generally from 20 to 400 parts per hundred parts of polymer by weight. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclo-pentadiene, 15% 2-methyl-2-butene and about 10% dimer, as taught in U.S. Pat. No. 3,577,398. Other tackifying resins may be employed wherein the resinous copolymer comprises 20-80 weight percent of piperylene and 80-20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpene-phenol resins and polymerized mixed olefins, lower softening point resins and liquid resins. An example of a liquid resin is Adtac® LV resin from Hercules. To obtain good thermooxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. Softening points of solid resins may be from about 40° C. to about 120° C. Liquid resins, i.e., softening points less than room temperature, may be used as well as combinations of solid and liquid resins. The amount of adhesion promoting resin employed varies from 0 to 400 parts by weight per hundred parts rubber (phr), preferably between 20 to 350 phr, most preferably 20 to 150 phr. The selection of the particular tackifying agent is, in large part, dependent upon the specific polymer employed in the respective adhesive composition.

A composition of the instant invention may contain plasticizers, such as rubber extending plasticizers, or compounding oils or organic or inorganic pigments and dyes. Rubber compounding oils are well-known in the art and include both high saturates content oils and naphthenic oils. Preferred plasticizers are highly saturated oils, e.g. Tufflo® 6056 and 6204 oil made by Arco and naphthenic process oils, e.g. Shellflex® 371 oil made by Shell. The amounts of rubber compounding oil employed in the invention composition can vary from 0 to about 150 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in sealant and adhesive formulations. This is especially true for exterior sealants in which fillers are added not only to create the desired appeal but also to improve the performance of the sealant such as its weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the sealant is intended. An especially preferred filler is titanium dioxide.

If the adhesive or sealant will be applied from solvent solution, the organic portion of the formulation will be dissolved in a solvent or blend of solvents. Aromatic hydrocarbon solvents such as toluene, xylene, or Shell Cyclo Sol 53 are suitable. Aliphatic hydrocarbon solvents such as hexane, naphtha or mineral spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50% w in the solvent blend.

Combinations of primary and secondary antioxidants are preferred. Such combinations include sterically hindered phenolics with phosphites or thioethers, such as hydroxyphenylpropionates with aryl phosphates or thioethers, or amino phenols with aryl phosphates. Specific examples of useful antioxidant combinations include 3-(3,5-di-t-butyl-4-hydroxyphenyl)propionate)methane (Irganox ® 1010 from Ciba-Geigy) with tris(nonylphenyl)phosphite (Polygard ® HR from Uniroyal), Irganox ® 1010 with bis(2,4-di-t-butyl)pentaerythritol diphosphite (Ultranox ® 626 from Borg-Warner).

Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

All adhesive and sealant compositions based on the polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive, coating or sealant application.

Adhesives are frequently thin layers of sticky compositions which are used in protected environments (adhering two substrates together). Therefore, unhydrogenated epoxidized polymers will usually have adequate stability so resin type and concentration will be selected for maximum stickiness without great concern for stability, and pigments will usually not be used.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, the hydrogenated epoxidized polymers are usually used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage.

A formulator skilled in the art will see tremendous versatility in the polymers of this invention to prepare adhesives and sealants having properties suitable for many different applications.

The adhesive and sealant compositions of the present invention can be prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then be used in a wide variety of applications. Alternatively, the ingredients may be blended into a solvent.

The adhesive compositions of the present invention may be utilized as many different kinds of adhesives, for example, laminating adhesives, pressure sensitive adhesives, tie layers, hot melt adhesives, solvent borne adhesives and waterborne adhesives in which the water has been removed before curing. The adhesive can consist of simply the polymer or, more commonly, a formulated composition containing a significant portion of the polymer along with other known adhesive composition components. A preferred method of application will be hot melt application at a temperature around or above 100° C. because hot melt application above 100° C. minimizes the presence of water and other low molecular weight inhibitors of cationic polymerization. The adhesive can be heated before and after cure to further promote cure or post cure. Radiation cure of hot adhesive is believed to promote faster cure than radiation cure at lower temperatures. The unhydrogenated precursors may also be used in these applications.

Preferred uses of the present compositions are the preparation of pressure-sensitive adhesive tapes and the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes. The unhydrogenated precursors may also be used in these applications.

Sealant compositions of this invention can be used for many applications. Particularly preferred is their use as gap fillers for constructions which will be baked (for example, in a paint baking oven) after the sealant is applied. This would include their use in automobile manufacture and in appliance manufacture. Another preferred application is their use in gasketing materials, for example, in lids for food and beverage containers. The unhydrogenated precursors may also be used in these applications.

EXAMPLES

Tables I through III demonstrate the advantages available from dissimilar arm block copolymers in pressure sensitive adhesive applications.

Table IA illustrates two useful molecular structures which are within the invention, as well as a control polymer which is widely used in the adhesives industry. Molecular weights and other descriptive data are given in Table IB. The polymers within the invention contain side chains of polyisoprene (2 and 4, respectively) and a saturated main chain of poly(ethylene/butylene) terminated with polystyrene blocks. The side chains and main chain are joined at the mid-point of the main chain through a coupling agent. The control polymer is predominantly S—EB—S triblock (no side chains), with 30% or less of S—EB diblock.

The total molecular weights of the polymers of the invention bracket that of the control polymer. Diblock content is lower than that of the control. The coupling efficiency figures of 87 percent and 89 percent, respectively indicate diblock content is ≦13 percent and ≦11 percent, respectively. In spite of the similarity in molecular weight and lower diblock content, the solution viscosity of the dissimilar arm polymers is much lower than that of the control (Table IB). Compared to conventional 100 percent unsaturated block copolymers used in the adhesives industry, the viscosity reduction is also striking. For example, the viscosity of KRATON® D1107 Rubber, a conventional polymer that has long been used in such applications, (20 percent in toluene) is 514 cps, compared to 180 and 93 cps, respectively, for the invention polymers shown in Table IB. This viscosity reduction is valuable in both polymer manufacture and end use application; e.g., ability to use higher solids contents, less solvent, easier application, lower pumping energy requirements, etc.

The polymers described in Table I were formulated in a pressure-sensitive adhesive formulation to glass transition temperatures of −20° C. (Table II) and −15° C. (Table III). Taken as a whole, the experimental polymers were superior to the control polymer in tack, peel strength and holding power to steel. Polymer #4918 was superior to the control in SAFT to Mylar. The superiority in tack was evident in qualitative finger tack comparisons as well as laboratory instrumental tack measurements.

In another example, Polymer #4918 was compared to the same control polymer using formulations calculated to give a Tg of −15° C. (Table III). In this case, #4918 was superior to the control in tack, peel strength and SAFT properties. It was somewhat inferior to the control in holding power to steel.

The ability to obtain a combination of high adhesive performance at low molecular weight and viscosity is attributed to the superior phase separation between polystyrene endblocks and poly(ethylene-butylene) rubber blocks compared to polystyrene and unsaturated diene rubber blocks.

TABLE I

Polymer Descriptions

A. Polymer Structures - Examples

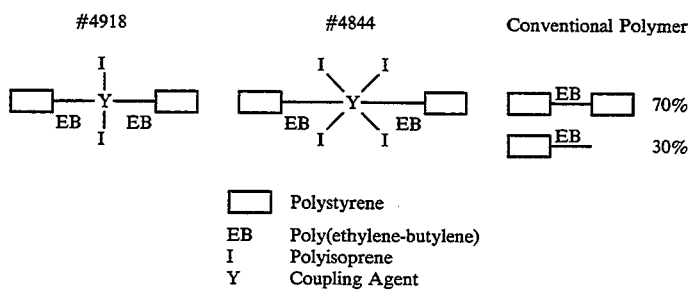

| | |
|---|---|
| ☐ | Polystyrene |
| EB | Poly(ethylene-butylene) |
| I | Polyisoprene |
| Y | Coupling Agent |

| B. Polymer Molecular Parameters | #4918 | #4844 | Conventional Polymer |
|---|---|---|---|
| Styrene block mol. wt., M | 9.3 | 6.0 | 5.3 |
| Main chain rubber mol. wt., M | 50 | 46 | 86 |
| Double bonds in main chain hydrogenated, % | >99 | >99 | >99 |
| Side chain rubber mol. wt., M | 18 | 3.8 | No side chains. |
| Number of side chains | 2 | 4 | 0 |
| Total mol. wt., M | 94 | 73 | 86 |
| Polymeric Styrene Content, % | 17.9 | 16.7 | 13 |
| Coupling Efficiency, % | 87 | 89 | 71 |
| Solution Viscosity, 20% wt. in toluene, cps | 180 | 93 | 1250 |

TABLE II

Properties of Adhesive Formulations (All formulated to Tg = −20° C.)

| A. Formulations | | | |
|---|---|---|---|
| Formulation Number | R-108 | R-084 | R-110 |
| Base Polymer | #4918 (Invention) | #4844 (Invention) | Conventional Polymer |
| Base Polymer | 100.0 | 100.0 | 100.0 |
| Hydrocarbon Resin (softening pt., 85° C.)[1] | 102.4 | 103.7 | 108.2 |
| Hydrocarbon Resin (softening pt., 18° C.)[2] | 144.5 | 146.4 | 152.8 |
| Hindered Phenolic[3] Antioxidant | 1.0 | 1.0 | 1.0 |
| UV Stabilizer No. 1[4] | 0.25 | 0.25 | 0.25 |
| UV Stabilizer No. 2[5] | 0.25 | 0.25 | 0.25 |
| Total phr (parts per hundred rubber-the polymer) | 348.4 | 351.6 | 362.5 |
| B. Properties | | | |
| Rolling Ball Tack, cm | 1.3 | 2.3 | 1.9 |
| Polyken Probe Tack, kg | 2.1 | 2.0 | 1.8 |
| Loop Tack, oz/in | 81 | 95 | 80 |
| 180 Deg. Peel Strength, pli | 5.8 | 8.0 | 5.4 |
| Holding Power/Steel, min | 180 | 125 | 67 |
| Holding Power/Kraft, min | 1.4 | 3.5 | 3.5 |

TABLE II-continued

| Properties of Adhesive Formulations (All formulated to Tg = −20° C.) | | | |
|---|---|---|---|
| SAFT, Mylar, deg. C. | 64 | 48 | 50 |
| SAFT, Kraft, deg. C. | <38 | <38 | <38 |
| Thickness of Adhesive Film, mils | 1.4 | 1.5 | 1.5 |

[1] Regalrez 1085; Hercules, Inc.; hydrogenated styrene/alpha methyl styrene copolymers
[2] Regalrez 1018; Hercules, Inc.; hydrogenated styrene/alpha methyl styrene copolymers
[3] Irganox 1010; CIBA-Geigy Corp.
[4] Tinuvin 327; CIBA-Geigy Corp.
[5] Tinuvin 770; CIBA-Geigy Corp.

TABLE III

Properties of Adhesive Formulations Formulated to Tg = −15 deg. C.

| A. Formulations | | |
|---|---|---|
| Formulation Number | R-131 | R-117 |
| Base Polymer | #4918 (Invention) | Conventional Polymer |
| Base Polymer | 100.0 | 100.0 |
| Hydrocarbon Resin (softening pt., 85° C.)[1] | 132.9 | 138.0 |
| Hydrocarbon Resin (softening pt., 18° C.)[2] | 100.5 | 95.2 |
| Hindered Phenolic[3] Antioxidant | 1.0 | 1.0 |
| UV Stabilizer No. 1[4] | 0.25 | 0.25 |
| UV Stabilizer No. 2[5] | 0.25 | 0.25 |
| Total phr | 334.9 | 334.7 |
| B. Properties | | |
| Rolling Ball Tack, cm | 2.6 | 7.2 |
| Polyken Probe Tack, kg | 2.3 | 0.83 |
| Loop Tack, oz/in | 101 | 95 |
| 180 Deg. Peel Strength, pli | 7.3 | 5.9 |
| Holding Power/Steel, min | 225 | 398 |
| Holding Power/Kraft, min | 6.3 | 6.7 |
| SAFT/Mylar, deg. C. | 70 | 62 |
| SAFT/Kraft, deg. C. | 55 | 38 |
| Thickness of Adhesive Film, mils | 1.5 | 1.4 |

[1] Regalrez 1085; Hercules, Inc.; hydrogenated styrene/alpha methyl styrene copolymers
[2] Regalrez 1018; Hercules, Inc.; hydrogenated styrene/alpha methyl styrene copolymers
[3] Irganox 1010; CIBA-Geigy Corp.
[4] Tinuvin 327; CIBA-Geigy Corp.
[5] Tinuvin 770; CIBA-Geigy Corp.

Though the polymers of this invention contain unsaturated arms of homopolymers, they behave primarily like the fully saturated block copolymers commonly used in adhesives when subjected to heat and accelerated weathering. Table IV compares the viscosity and color stability of a polymer of the invention with those of a conventional saturated polymer (see Table I) and a conventional unsaturated polymer widely used in the industry (KRATON® D1107 Rubber, a linear S—I—S of 160M molecular weight and 15 percent styrene content made by Shell Oil Company). Adhesive compositions based on these three polymers were subjected to a temperature of 350° F. for 96 hours, with viscosity and color measured at various intervals. Such a test is important in predicting the behavior of hot melt adhesive compositions. The polymer of the invention approximated the behavior of the fully saturated polymer in maintaining viscosity and color over time, and was markedly superior to the unsaturated polymer in these respects.

TABLE IV

| | Melt Stability | | |
|---|---|---|---|
| Base Polymer of Formulation | Conventional Saturated Polymer[1] | Invention Polymer #4918[1] | Conventional Unsaturated Polymer[2] |
| Time at 350 deg. F. hr. | Melt Viscosity, cps[3] | | |
| 0 | 52,200 | 13,920 | 71,800 |
| 8 | 52,300 | 13,820 | 41,800 |
| 24 | 52,200 | 13,150 | 27,530 |
| 48 | 54,200 | 10,210 | 12,550 |
| 96 | 52,150 | 10,730 | 19,100 |

TABLE IV-continued

| | Melt Stability | | |
|---|---|---|---|
| Base Polymer of Formulation | Conventional Saturated Polymer[1] | Invention Polymer #4918[1] | Conventional Unsaturated Polymer[2] |
| | Gardner Color | | |
| 0 | 1 | 1 | 10 |
| 8 | 3 | 3 | 13 |
| 24 | 4 | 4 | 14 |
| 48 | 6 | 10 | 17 |
| 96 | 6 | 11 | 15 |

[1] Formulation: Polymer, 100 parts by weight (pbw); Regalrez 1085 resin, 125 pbw; Regalrez 1018 resin, 20 pbw; Irganox 1010, 1.0 pbw; Tinuvin 770, 0.25 pbw; Tinuvin 327, 0.25 pbw.
[2] Formulation: Polymer, 100 pbw; Piccotac 95 resin, 135 pbw; Shellflex 371 oil, 15 pbw; Irganox 1010, 1.0 pbw; Tinuvin 770, 0.25 pbw; Tinuvin 327, 0.25 pbw.
[3] Brookfield viscosity, Model RVTD.

For consideration as a polymer for weatherable adhesives, the invention polymers should withstand outdoor aging conditions as well as conditions in laboratory devices designed to predict outdoor aging stability. Table V shows that an adhesive based on a polymer of the invention maintains peel strength over time at least as well as a conventional saturated polymer-based adhesive. Furthermore, the mode of failure remains a clean adhesive peel (which is desirable) whereas an adhesive based on unsaturated polymer begins to fail cohesively (that is, leaves a layer of adhesive on both the substrate and backing film) after a short aging period. This behavior of the unsaturated polymer-based adhesive is probably due to weakening caused by degradation. Similar conclusions can be drawn from results of accelerated aging studies, which are shown in Table VI.

TABLE V

Outdoor Aging
(45 deg. to south)
Pressure Sensitive Tape

| Base Polymer of Formulation | Conventional Saturated Polymer[1] | Invention Polymer #4918[1] | Conventional Unsaturated Polymer[2] |
|---|---|---|---|
| Aging time, days | 180 deg. Peel Strength, pli | | |
| 0 | 4.1A[3] | 6.4A | 9.3A |
| | Aged through Glass | | |
| 15 | 6.0A | 5.7A | 9.5C |
| 30 | 4.3A | 5.1A | 6.9C |
| | Aged through Mylar | | |
| 15 | 5.4A | 6.3A | 10.8C |
| 30 | 4.6A | 5.5A | 7.5C |

[1]See footnote 1, Table IV.
[2]See footnote 2, Table IV.
[3]A signifies adhesive failure; C, cohesive failure.

TABLE VI

Accelerated Aging
(Laboratory QUV Cabinet, UVB 313 lamp)
Pressure Sensitive Tape

| Base Polymer of Formulation | Conventional Saturated Polymer[1] | Invention Polymer #4918[1] | Conventional Unsaturated Polymer[2] |
|---|---|---|---|
| Aging time, hr. | 180 deg. Peel Strength, pli | | |
| 0 | 3.9A[3] | 6.8A | 8.8A |
| | Aged through Glass | | |
| 100 | 5.4A | 5.1A | 6.5C |
| 300 | 2.7A | 5.4A | 4.9C |
| 500 | 3.8A | 3.1A | —[4] |

[1]See footnote 1, Table IV.
[2]See footnote 2, Table IV.
[3]A signifies adhesive failure; C, cohesive failure.
[4]Backing failed.

Incorporating unsaturated polymer arms into a basically saturated block copolymer structure adds the potential for crosslinking of the system, with its attendant benefits in resistance to shear and heat in the application. The invention polymer is amenable to crosslinking using a variety of techniques. Table VII illustrates that electron beam (EB) radiation crosslinks an adhesive composition based on the invention polymer #4918 at doses of 10 and 16 megarads (gel contents of 38 percent and 81 percent of base polymer, respectively, are attained). Shear adhesion failure temperature (SAFT) is markedly improved without any major loss in tack properties.

The presence of unsaturated polymer arms in the otherwise saturated invention block copolymer increases the number of reaction sites for functionalization. The functionalized polymer frequently has improved adhesion properties because of its increased polarity. Functionalized polymers also may be more reactive in radiation-induced crosslinking processes. In the example of Table VII, electron beam radiation was used to crosslink an adhesive formulation based on an invention polymer that had been epoxidized. Crosslinking occurred at relatively low doses (as little as 2 or 6 megarads with gel contents of 14 percent and 74 percent of base polymer, respectively). Holding power and SAFT values were increased substantially with little or no effect on tack properties except at very high doses.

TABLE VII

Electron Beam (EB) Crosslinking[1]

| | Invention Polymer #4918 | | | | | Invention Polymer #4918, Epoxidized[2] | | | | |
|---|---|---|---|---|---|---|---|---|---|---|
| Dose, megarads | 0 | 2 | 6 | 10 | 16 | 0 | 2 | 6 | 10 | 16 |
| Gel, % of base polymer | 0 | 0 | 0 | 38 | 81 | 0 | 14 | 74 | 97 | 88 |
| Rolling Ball Tack, cm | 1.8 | 1.7 | 1.8 | 2.3 | 2.3 | 3.1 | 2.3 | 2.6 | 4.7 | 6.8 |
| Loop Tack, oz/in | 51 | 38 | 54 | 48 | 48 | 57 | 75 | 61 | 58 | 51 |
| Polyken Probe Tack, kg | .82 | .89 | .92 | .90 | .65 | .64 | .76 | .73 | .40 | .52 |
| 180 deg. Peel Str., pli | 3.5 | 2.6 | 2.3 | 2.2 | 2.3 | 3.8 | 2.5 | 2.2 | 2.2 | 2.0 |
| Holding Power to Steel, min[3] | 197 | 489 | 574 | 152 | 183 | 14 | 75 | 778 | >7000 | — |
| SAFT[4] on Mylar, deg. C. | 82 | 87 | 91 | 114 | 127 | 82 | 83 | 113 | 118 | 114 |

[1]Formulation: Polymer, 100 pbw; Regalrez 1085 resin, 54 pbw; Regalrez 1018 resin, 68 pbw; Polygard HR antioxidant, 1.0 pbw. EB curing was accomplished on an Energy Sciences, Inc., Electron Beam Unit, Model CB-150.
[2]Epoxidized to 1.26 meq/g by method described in U.S. Pat. No. 5,229,464.
[3]0.5 in. × 0.5 in bond, 2 kg weight.
[4]Shear Adhesion Failure Temperature of lap shear bond, 1 in × 1 in, 2 kg weight.

Similarly, epoxidized and non-epoxidized block copolymers of the invention crosslink readily in adhesive formulations under ultraviolet light (UV). Table VIII illustrates results obtained using a Linde Photocure System from Union Carbide Corporation. Substantial crosslinking took place on the epoxidized version even at the lowest dosages (highest belt speeds shown in Table VIII).

TABLE VIII

Crosslinking by Ultraviolet Light Radiation[1]

| Base Polymer of Formulation | Invention Polymer #4918[1] | Invention Polymer #4918 Epoxidized[3][4] |
|---|---|---|
| | Gel, % of base polymer | |
| No dose | 3.3 | 3.2 |
| Belt Speed, ft/min[5] | | |
| 56 | 13 | 89 |
| 44 | — | 87 |
| 32 | 9 | 90 |
| 21 | 6 | 92 |
| 7.5 | 41 | 90 |
| 3.8 | 56 | 92 |

[1]Irradiated with UV light by the method described in U.S. Pat. No. 5,229,464 which is herein incorporated by reference (Linde Photocure Systems, Union Carbide Corp.).
[2]Formulation: Polymer, 100 pbw; Regalrez 1085 resin, 58 pbw; Regalrez 1018 resin, 65 pbw; Polygard HR antioxidant, 1.0 pbw; Irgacure 651 photoinitiator, 1.0 pbw; 1,6 hexanediol diacrylate crosslinker, 7.5 pbw.
[3]Epoxidized to 1.26 meq/g by the method described in U.S. Pat. No. 5,229,464.
[4]Formulation: Polymer, 100 pbw; Regalrez 1085 resin, 54 pbw; Regalrez 1018 resin, 68 pbw; Polygard HR antioxidant, 1.0 pbw; Cyracure UVI 6974 cationic photoinitiator, 1.1 pbw.
[5]The slower the belt speed, the higher the radiation dose.

In Table IX, the results of a crosslinking study are presented in which initiation and propagation are chemical in nature, unaided by any form of radiation. The crosslinking agent is a urea-formaldehyde resin and the reaction is catalyzed by dodecylbenzene sulfonic acid. Gel contents of 80 to 90 percent are created over 20 to 40 minutes at 149° to 177° C. These results are illustrative of the fact that the unsaturated arms of the invention polymers will undergo a variety of chemical reactions leading to network formation. Such structures improve service temperatures, solvent resistance and shear properties in adhesives, sealants, coatings, and many other applications.

TABLE IX

Chemical Crosslinking

Formulation

| | | |
|---|---|---|
| Invention polymer #4918 | 100.0 | pbw |
| Beetle ® 80[(1)] | 11.1 | pbw |
| Cycat ® 600[(2)] | 1.1 | pbw |
| Irganox 1010 antioxidant | 0.5 | pbw |
| Polygard HR antioxidant | 0.5 | pbw |
| | 113.2 | |

| Cure Temp., °C. | Cure Time, min. | Gel (polymer basis) Content, % |
|---|---|---|
| 149 | 20 | 80 |
| 149 | 40 | 90 |
| 177 | 20 | 87 |

[(1)]Urea-formaldehyde resin, American Cyanamid Co.
[(2)]Catalyst, 70% solution of dodecylbenzene sulfonic acid in isopropanol, American Cyanamid Co.

We claim:

1. Radial or star asymmetric block copolymers of the formula

wherein A is a vinyl aromatic hydrocarbon block having a peak molecular weight as determined by gel permeation chromatoqraphy of from 4000 to 20,000, HD is a hydrogenated conjugated diene block having a peak molecular weight as determined by gel permeation chromatography of from 10,000 to 100,000, Y is a multifunctional coupling agent, UD is an unhydrogenated conjugated diene block having a peak molecular weight as determined by gel permeation chromatography of from 1000 to 80,000, the block copolymer has a vinyl aromatic hydrocarbon content of from 4 to 35 percent by weight, x is an integer from 2 to 20, z is an integer from 1 to 10, and x+z ranges from 3 to 30.

2. The copolymers of claim 1 wherein the block copolymer is a radial block copolymer of formula (I) and x is 2 to 4, z is 1 to 4 and x+z is 3 to 6.

3. The copolymers of claim 1 wherein the hydrogenated diene is butadiene and the unhydrogenated diene is isoprene.

4. Improved adhesive and sealant compositions comprising the copolymers of claim 1 and a tackifying resin.

5. The compositions of claim 4 wherein the compositions are crosslinked.

6. Improved adhesive and sealant compositions comprising the copolymers of claim 2 and a tackifying resin.

7. The compositions of claim 6 wherein the compositions are crosslinked.

8. Improved adhesive and sealant compositions comprising the copolymers of claim 3 and a tackifying resin.

9. The compositions of claim 8 wherein the compositions are crosslinked.

* * * * *